(12) United States Patent
Kelly et al.

(10) Patent No.: US 10,507,830 B2
(45) Date of Patent: Dec. 17, 2019

(54) CONTROL SYSTEM AND METHOD

(71) Applicant: Jaguar Land Rover Limited, Whitley, Coventry (GB)

(72) Inventors: James Kelly, Solihull (GB); Andrew Fairgrieve, Rugby (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 139 days.

(21) Appl. No.: 15/507,557

(22) PCT Filed: Aug. 26, 2015

(86) PCT No.: PCT/EP2015/069504
§ 371 (c)(1),
(2) Date: Feb. 28, 2017

(87) PCT Pub. No.: WO2016/034465
PCT Pub. Date: Mar. 10, 2016

(65) Prior Publication Data
US 2018/0229727 A1    Aug. 16, 2018

(30) Foreign Application Priority Data

Sep. 1, 2014 (GB) .................................. 1415427.2

(51) Int. Cl.
 *B60W 30/14* (2006.01)
 *B60W 50/14* (2012.01)
 *F16H 63/42* (2006.01)

(52) U.S. Cl.
 CPC .......... *B60W 30/143* (2013.01); *B60W 50/14* (2013.01); *F16H 63/42* (2013.01);
 (Continued)

(58) Field of Classification Search
None
See application file for complete search history.

(56) References Cited

U.S. PATENT DOCUMENTS 7,917,267 B2    3/2011   Aigner et al.
2008/0255738 A1* 10/2008 Murayama ............ B60W 30/19
                                                                 701/54
(Continued)

FOREIGN PATENT DOCUMENTS

DE         10210545 A1 *  9/2003  ......... B60K 31/0008
DE       102007044401 A1   3/2009
(Continued)

OTHER PUBLICATIONS

Combined Search and Examination Report for application No. GB1415427.2, dated Feb. 19, 2015, 5 pages.
(Continued)

*Primary Examiner* — Timothy Hannon
(74) *Attorney, Agent, or Firm* — Reising Ethington P.C.

(57) ABSTRACT

A speed control system for automatically controlling the speed of a vehicle. The system operates according to a method that includes: causing automatically a vehicle to travel at a predetermined speed value at least in part by controlling an amount of torque applied to one or more wheels of a vehicle; determining a recommended transmission gear ratio for a transmission of the powertrain at a given moment in time; providing an indication of the recommended transmission gear ratio to a user; and receiving a clutch actuation signal indicative of an actuation state of a clutch that is configured to connect the transmission to a torque drive source. The system is configured automatically to control a speed of the torque drive source to achieve a speed determined in dependence at least in part on at least one predetermined parameter when a predetermined one or more conditions are met.

15 Claims, 8 Drawing Sheets

(52) U.S. Cl.
CPC ... *B60W 2050/146* (2013.01); *B60W 2400/00* (2013.01); *B60W 2510/0208* (2013.01); *B60W 2540/10* (2013.01); *B60W 2540/12* (2013.01); *B60W 2550/141* (2013.01); *B60W 2600/00* (2013.01); *B60W 2710/1005* (2013.01); *B60W 2710/105* (2013.01); *B60W 2720/10* (2013.01); *F16H 2063/426* (2013.01)

(56) References Cited

U.S. PATENT DOCUMENTS

| | | |
|---|---|---|
| 2010/0138119 A1 | 6/2010 | Habert et al. |
| 2013/0131965 A1 | 5/2013 | Attensperger |
| 2015/0151754 A1* | 6/2015 | Han .................. B60W 30/16 |
| | | 701/96 |

FOREIGN PATENT DOCUMENTS

| | | |
|---|---|---|
| EP | 0634592 A2 | 6/1995 |
| EP | 1967772 A2 | 9/2008 |
| EP | 1983177 A2 | 10/2008 |
| EP | 1990562 A2 | 11/2008 |
| EP | 2548780 A2 | 1/2013 |
| JP | 2013230748 A | 11/2013 |
| WO | 2014027058 A1 | 2/2014 |

OTHER PUBLICATIONS

International Search Report for International application No. PCT/EP2015/069504, dated Apr. 19, 2016, 9 pages.
Written Opinion for International application No. PCT/EP2015/069504, dated Apr. 19, 2016, 10 pages.

* cited by examiner

CONTROL SYSTEM AND METHOD

INCORPORATION BY REFERENCE

The content of UK patent applications GB2492748, GB2492655 and GB2499252 is incorporated herein by reference.

TECHNICAL FIELD

The present invention relates to vehicle speed control systems. In particular but not exclusively the invention relates to monitoring of vehicle speed control systems to ensure correct operation.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common.

It is an aim of embodiments of the present invention to address disadvantages associated with the prior art.

SUMMARY OF THE INVENTION

Embodiments of the invention may be understood with reference to the appended claims.

Aspects of the present invention provide a system, a vehicle and a method.

In one aspect of the invention for which protection is sought there is provided a speed control system for automatically controlling the speed of a vehicle in accordance with a target speed value, the system comprising:

means for causing automatically a vehicle to travel at a predetermined speed value at least in part by controlling an amount of torque applied to one or more wheels of a vehicle by a powertrain;

means for determining a recommended transmission gear ratio for a transmission of the powertrain at a given moment in time;

means for providing an indication of the recommended transmission gear ratio to a user; and means for receiving a clutch actuation signal indicative of an actuation state of clutch means that is configured to connect the transmission to a torque drive source of the powertrain, wherein the system is configured automatically to control a speed of the torque drive source to achieve a speed determined in dependence at least in part on at least one predetermined parameter when a predetermined one or more conditions are met, the predetermined one or more conditions including the condition that the clutch actuation signal indicates that the actuation state of the clutch means is such that the torque drive source is at least partially disconnected from the transmission.

It is to be understood that the speed control system has the advantage that, because a user is prompted when to change gear, and the speed of the torque drive source is controlled automatically by the system when the actuation state of the clutch means is such that the torque drive source is at least partially disconnected from the transmission, a workload imposed on a user is reduced. As stated below, optionally the predetermined one or more conditions include the condition that the clutch actuation signal indicates that the actuation state of the clutch means is such that the torque drive source has been substantially fully disconnected from the transmission. The control system may continue to control the speed of the torque drive source following full disconnection until the clutch actuation signal indicates the torque drive source is fully reconnected to the transmission.

The torque drive source may comprise an engine, an electric motor, and/or any other suitable torque drive source.

Optionally the at least one predetermined parameter includes a parameter indicative of a speed of a predetermined portion of the powertrain corresponding to or substantially equal to a speed of an output portion of the clutch means, the system being configured to control the speed of the torque drive source to achieve a speed at which a speed of an input portion of the clutch means is substantially equal to that of an output portion of the clutch means.

The speed of the predetermined portion of the powertrain may be a speed of a road wheel, a driveshaft, an input or output portion of the transmission, the output portion of the clutch means or any other suitable portion of the powertrain.

It is to be understood that in some embodiments the system may attempt to cause a speed of an input portion of the clutch means to substantially match, i.e. become substantially equal to, that of an output portion of the clutch means when the further condition is met that a user has commenced attempting to cause the actuation state of the clutch means to assume a state in which the torque drive source is substantially fully connected to the transmission. Such a condition may be met, for example, when a user begins to release a clutch pedal after depressing the pedal by an amount sufficient to substantially disconnect the torque drive source from the transmission.

This feature has the advantage that vehicle composure may be maintained when a clutch reconnect operation is performed in which the clutch means reconnects the torque drive source substantially fully to the transmission, for example following a change in transmission gear ratio. In contrast, if a user were required manually to control the speed of the torque drive source, for example by means of an accelerator pedal, so as to match the speed of the input portion of the clutch means to that of the output portion, vehicle composure may be degraded in dependence on the extent of any mismatch between the respective speeds as the clutch means reconnects the torque drive source and the transmission. It is to be understood that a driver may be subject to a relatively high workload steering a vehicle and selecting a route ahead of the vehicle, particularly when negotiating off-road terrain, and reducing driver workload by controlling the speed of the torque drive source, which may be an engine, may be particularly advantageous in such circumstances.

The system may be configured to control the torque drive source such that a speed of an input portion of the clutch means substantially matches the speed of the output portion of the clutch means by reference to one or more signals indicative of a speed of the respective portions. The one or more signals indicative of speed may include a signal indicative of a speed of the torque drive source and a signal indicative of a speed of an input portion of a transmission. Alternatively the one or more signals indicative of speed may include a signal indicative of a speed of the torque drive source, a signal indicative of transmission gear ratio and a signal indicative of a speed of an output portion of the transmission such as a wheel speed or speed of another portion of the driveline in a torque path from the transmission to a wheel. It is to be understood that the speed of the input portion of the transmission may depend at least in part on the selected transmission gear ratio and the speed of the output portion of the transmission.

Other arrangements may be useful in some embodiments.

Optionally the clutch actuation signal indicative of the actuation state of the clutch means comprises a signal indicative of a position of a user actuated clutch means control or an amount of pressure applied to a user actuated clutch means control by a user.

It is to be understood that the position of the user actuated clutch means control or the amount of pressure applied to the clutch means control by the user may be indicative of the actuation state of clutch means in some embodiments. The clutch means control may be a foot pedal, a hand operated control such as a lever, or any other suitable control. The control may be a bistable control or a monostable control. The control may be a binary state control such as a push button control. For example, the system may be configured such that a single press of the button results in clutch means actuation to substantially fully disconnect the torque drive source from the transmission, whilst a further press of the button results in clutch means actuation to substantially fully reconnect the torque drive source to the transmission Optionally, the predetermined one or more conditions include the condition that the clutch actuation signal indicates that the clutch means control is being or has been actuated so as to begin to cause the clutch means to transition from a state in which the torque drive source is at least partially disconnected from the transmission towards a state in which the torque drive source is substantially fully connected to the transmission.

It is to be understood that in some embodiments the system may begin to attempt to control the speed of the torque drive source such that a speed of an input portion of the clutch means corresponds substantially to that of an output portion of the clutch means whilst the torque drive source is disconnected from the transmission by the clutch means substantially only when the clutch actuation signal indicates that the user is actuating or has actuated the clutch means control to cause the clutch means to transition from a state in which the torque drive source is at least partially disconnected from the transmission towards a state in which the torque drive source is substantially fully connected to the transmission. Such a transition may be referred to as clutch closure. Clutch closure may be detected as commencement of movement of a clutch control means such as a clutch pedal from a depressed position towards a released position.

Optionally the at least one predetermined parameter includes a signal indicative of a currently selected transmission gear ratio, the system being configured to control the speed of the torque drive source to achieve a speed at which a speed of an input portion of the clutch means will be substantially equal to that of an output portion of the clutch means with the currently selected transmission gear ratio.

The signal indicative of the currently selected transmission gear ratio may indicate the prevailing value of selected transmission ratio at a given moment in time.

Optionally, the at least one predetermined parameter includes a signal indicative of the recommended transmission gear ratio, the system being configured to control the speed of the torque drive source to achieve a speed at which a speed of an input portion of the clutch means would be substantially equal to that of an output portion of the clutch means with the recommended transmission gear ratio selected.

This feature has the advantage that the system may prepare the powertrain for re-connection of the torque drive source and transmission once disconnection of the torque drive source and transmission has taken place even before a user selects the recommended transmission gear ratio. This increases the likelihood of relatively little or no speed mismatch between input and output portions of the clutch means when the torque drive source and transmission are re-connected since a longer period of time exists within which the system can prepare for reconnection.

From the above discussion it is to be understood that in some embodiments the system may prepare the powertrain for re-connection of the torque drive source and transmission in the transmission gear that is selected at a given moment in time by controlling the speed of the torque drive source so as to match the speeds of the input and output portions of the clutch means when the condition is met that the clutch actuation signal indicates that the actuation state of the clutch means is such that the torque drive source is at least partially disconnected from the transmission. Optionally the system may control the speed of the torque drive source so as to match the speeds of the input and output portions of the clutch means regardless of whether the currently selected transmission gear is the recommended transmission gear. In some embodiments the system may wait until a user has selected the recommended transmission gear ratio before controlling automatically the speed of the torque drive source to match the speed of the torque drive source to that of the transmission.

In some embodiments, if the transmission assumes a neutral mode when a change in gear ratio is being effected the torque drive source may be configured to assume an idle speed, that is a predetermined speed value such as a default idle speed, until a transmission gear ratio is subsequently selected. Other arrangements may be useful in some embodiments.

Optionally, the predetermined condition that the clutch actuation signal indicates that the actuation state of the clutch means is such that the torque drive source is at least partially disconnected from the transmission comprises the condition that the clutch actuation signal indicates that the actuation state of the clutch means is such that the torque drive source is substantially fully disconnected from the transmission.

The system may be configured temporarily to suspend application of powertrain torque to cause the vehicle to travel at the predetermined speed value in dependence on the clutch actuation signal.

It is to be understood that the system may continue to employ torque provided by an alternative system to the powertrain such as a braking system, when appropriate, in order to attempt to cause the vehicle to operate in accordance with the target speed value, when the transmission and torque drive source are disconnected or, in some embodiments, at least partially disconnected. This may be particularly appropriate when a vehicle is travelling downhill, where the vehicle may tend to accelerate under gravity once disconnection commences, in the absence of braking torque from the torque drive source, such as engine braking torque. The speed control system may for example apply a braking system in order to maintain a substantially constant speed, decelerate the vehicle, or limit a rate of acceleration of the vehicle, depending on the target speed value.

The system may be configured temporarily to suspend application of powertrain torque to cause the vehicle to travel at the predetermined speed value in dependence on the clutch actuation signal, the system being configured to attempt to cause the vehicle to travel at the predetermined speed value by causing application of brake torque by means of a braking system when the clutch actuation signal indicates the torque drive source and transmission have been at least partially disconnected from one another.

Thus, speed control may be maintained when the torque drive source and transmission are disconnected, albeit by using the braking system and not the powertrain.

The system may be configured temporarily to suspend causing the vehicle to travel at the predetermined speed value by application of powertrain torque once the clutch actuation signal indicates the torque drive source and transmission have been at least partially disconnected from one another, without requiring that the clutch actuation signal indicates that torque drive source and transmission are substantially fully disconnected from one another. Thus, excessive slippage of the clutch means due to the speed control system attempting to maintain vehicle speed control using the powertrain whilst the torque drive source and transmission are partially disconnected from one another may be avoided.

The system may be configured to recommence causing the vehicle to travel at the predetermined speed value at least in part by application of powertrain torque in dependence on the clutch actuation signal.

The system may be configured to recommence causing the vehicle to travel at the predetermined speed value at least in part by application of powertrain torque when the clutch actuation signal indicates that the torque drive means has been substantially fully reconnected to the transmission by the clutch means.

Optionally, the means for causing automatically a vehicle to travel at a predetermined speed value and the means for determining a recommended transmission gear ratio for a transmission comprise an electric controller, the electric controller being configured to output a signal to cause a powertrain to apply a required amount of powertrain torque to one or more wheels of a vehicle.

Optionally, the electric controller is configured to determine the required amount of powertrain torque in dependence at least in part upon a difference between the instant speed of the vehicle and the required speed value.

Optionally, the means for providing an indication of the recommended transmission gear ratio to a user comprises means for providing a visual and/or audible indication whether an increase or decrease in transmission gear ratio is required.

In some embodiments the system may accomplish this by providing a visual or audible indication as to whether a decrease or increase in transmission gear number is required.

In a further aspect of the invention for which protection is sought there is provided a method of controlling automatically a speed of a vehicle in accordance with a target speed value, the method comprising:

causing automatically a vehicle to travel at a predetermined speed value at least in part by controlling an amount of torque applied to one or more wheels of a vehicle by a powertrain;

determining a recommended transmission gear ratio for a transmission of the powertrain at a given moment in time;

providing an indication of the recommended transmission gear ratio to a user, and receiving a clutch actuation signal indicative of an actuation state of clutch means configured to connect the transmission to a torque drive source of the powertrain, the method comprising automatically controlling a speed of the torque drive source to achieve a speed determined in dependence at least in part on a predetermined parameter when a predetermined one or more conditions are met, the predetermined one or more conditions including the condition that the clutch actuation signal indicates that the actuation state of the clutch means is such that the torque drive source is at least partially disconnected from the transmission.

Optionally, the predetermined parameter includes a parameter indicative of a speed of a predetermined portion of the powertrain corresponding to or substantially equal to a speed of an output portion of the clutch means, the method comprising controlling the speed of the torque drive source to achieve a speed at which a speed of an input portion of the clutch means is substantially equal to that of an output portion of the clutch means.

Optionally, the clutch actuation signal indicative of the actuation state of the clutch means comprises a signal indicative of a position of a user actuated clutch means control or an amount of pressure applied to a user actuated clutch means control by a user.

Optionally, the predetermined one or more conditions include the condition that the clutch actuation signal indicates that the clutch means control is being or has been actuated so as to begin to cause the clutch means to transition from a state in which the torque drive source is at least partially disconnected from the transmission towards a state in which the torque drive source is substantially fully connected to the transmission.

Optionally, the at least one predetermined parameter includes a signal indicative of a currently selected transmission gear ratio, the method comprising controlling the speed of the torque drive source to achieve a speed at which a speed of an input portion of the clutch means is substantially equal to that of an output portion of the clutch means with the currently selected transmission gear ratio.

Optionally, the at least one predetermined parameter includes a signal indicative of the recommended transmission gear ratio, the method comprising controlling the speed of the torque drive source to achieve a speed at which a speed of an input portion of the clutch means would be substantially equal to that of an output portion of the clutch means with the recommended transmission gear ratio selected.

In one aspect of the invention for which protection is sought there is provided a carrier medium carrying computer readable code for controlling a vehicle to carry out the method of another aspect of the invention.

In one aspect of the invention for which protection is sought there is provided a computer program product executable on a processor so as to implement the method of another aspect of the invention.

In one aspect of the invention for which protection is sought there is provided a computer readable medium loaded with the computer program product of another aspect of the invention. The computer readable medium may comprise a non-transitory, computer-readable storage medium storing instructions thereon that when executed by one or more electronic processors causes the one or more electronic processors to carry out the method as described hereinabove.

In one aspect of the invention for which protection is sought there is provided a vehicle comprising a system as described hereinabove. The vehicle preferable comprises: a powertrain comprising a torque drive source and a transmission; and a clutch means configured to selectively connect the transmission to the torque drive source.

In one aspect of the invention for which protection is sought there is provided a processor arranged to implement the method of an aspect of the invention, or the computer program product of an aspect of the invention.

In one aspect of the invention for which protection is sought there is provided an electronic controller for a vehicle having a storage medium associated therewith storing instructions that when executed by the controller causes the control of the vehicle in accordance with a target speed value, the method comprising: causing automatically a vehicle to travel at a predetermined speed value at least in part by controlling an amount of torque applied to one or more wheels of a vehicle by a powertrain; determining a recommended transmission gear ratio for a transmission of the powertrain at a given moment in time; providing an indication of the recommended transmission gear ratio to a user, and receiving a clutch actuation signal indicative of an actuation state of a clutch configured to connect the transmission to a torque drive source of the powertrain, the method comprising automatically controlling a speed of the torque drive source to achieve a speed determined in dependence at least in part on a predetermined parameter when a predetermined one or more conditions are met, the predetermined one or more conditions including the condition that the clutch actuation signal indicates that the actuation state of the clutch is such that the torque drive source is at least partially disconnected from the transmission.

The controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A controller may be implemented in software run on one or more processors. Other suitable arrangements may also be used.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

References herein to a block such as a function block are to be understood to include reference to items of vehicle hardware, such as electronic modules, and to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
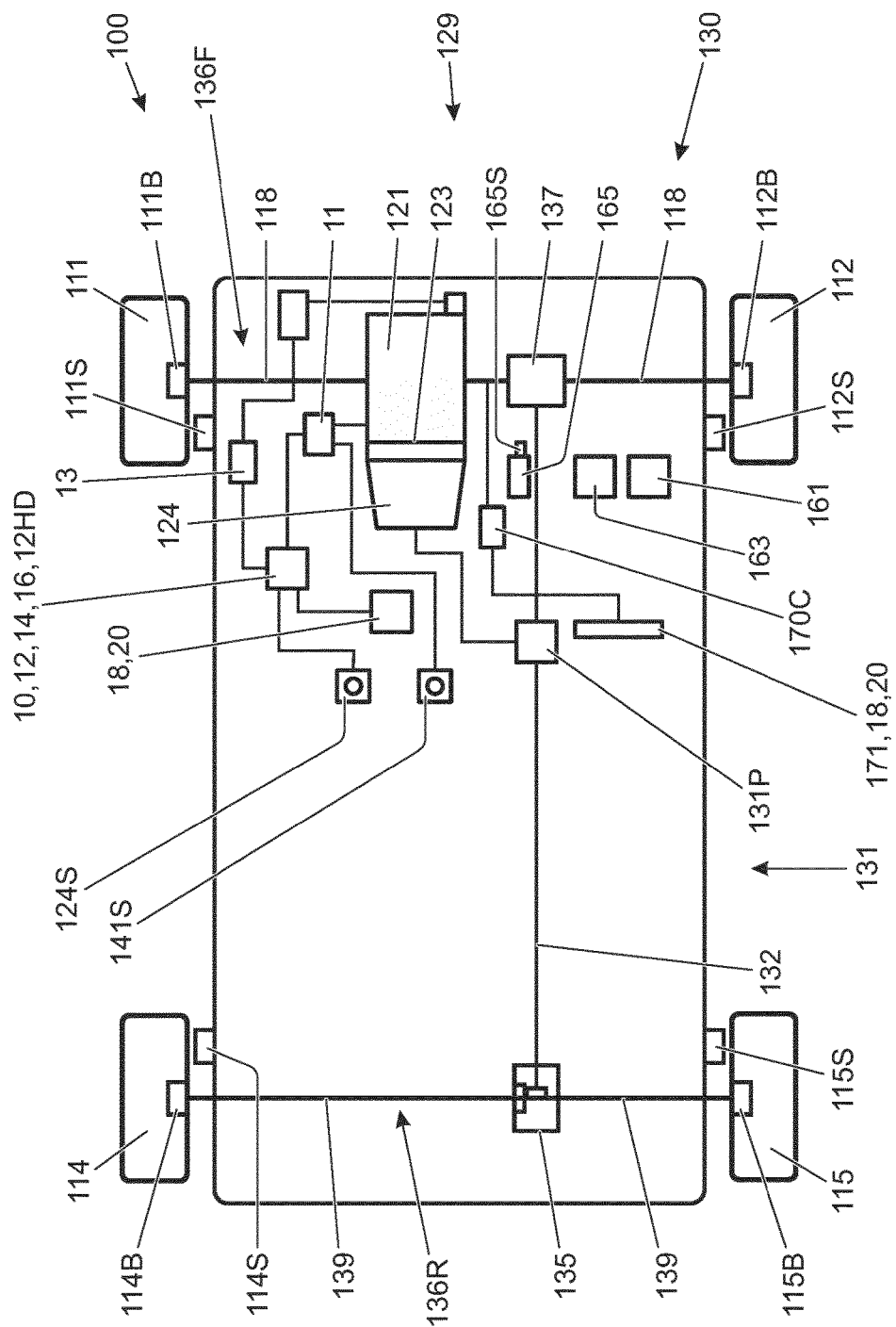
FIG. 1 is a schematic illustration of a vehicle according to an embodiment of the invention in plan view.
Figure 2:
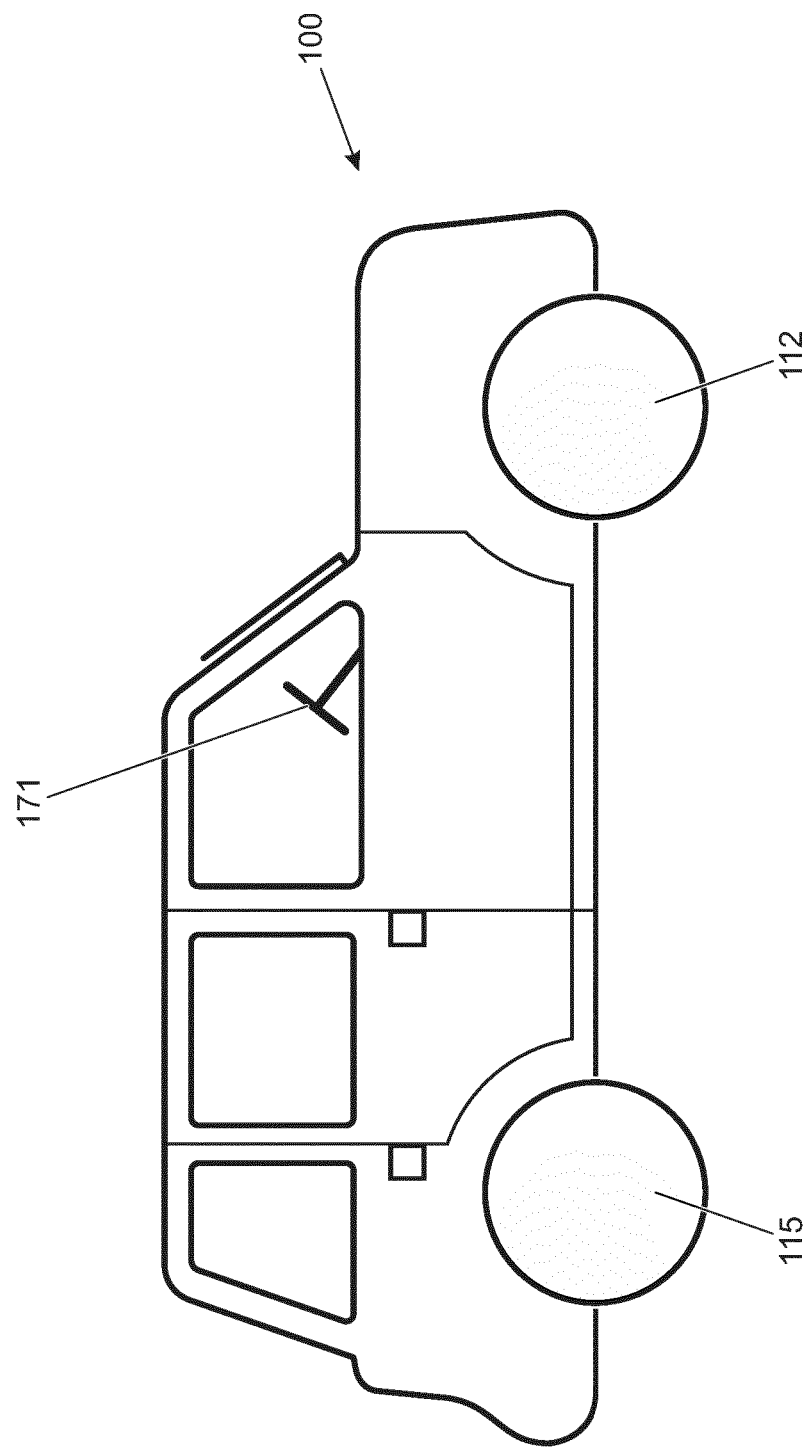
FIG. 2 shows the vehicle of FIG. 1 in side view.

FIG. 1 shows a vehicle 100 according to an embodiment of the present invention. The vehicle 100 has a powertrain 129 that includes a source of drive torque (a torque drive source) for the vehicle, in the example shown this is an engine 121 that is connected to a driveline 130 having a manual transmission 124. A clutch 123 is provided with an input portion and an output portion such that it is operable to allow an output shaft of the engine 121 (connected to the input portion of the clutch) to be connected to an input shaft of the transmission 124 (connected to the output portion of the clutch) in order to allow drive torque to be transmitted from the engine 121 to the transmission 124. The clutch 123 is operated by means of a user-operated foot pedal 165.

In the embodiment of FIG. 1 the transmission 124 may be set to one of eight transmission operating modes, being a neutral mode, six forward gear ratio modes, and a reverse gear ratio mode. In the neutral mode no transmission gear ratio is selected and the transmission is configured not to transmit drive torque from an input to an output thereof. In the six forward gear ratio modes, which may be referred to as gears one to six respectively, the transmission 124 is configured for forward driving at different respective gear ratios according to the selected mode in the conventional manner. In the reverse mode a reverse gear ratio is selected, referred to as "reverse gear".

The transmission 124 has a gear ratio selector lever 124S by means of which a user may select the required transmission operating mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are arranged to measure a speed of the corresponding wheel.

Embodiments of the invention are suitable for use with vehicles in which the transmission 124 is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
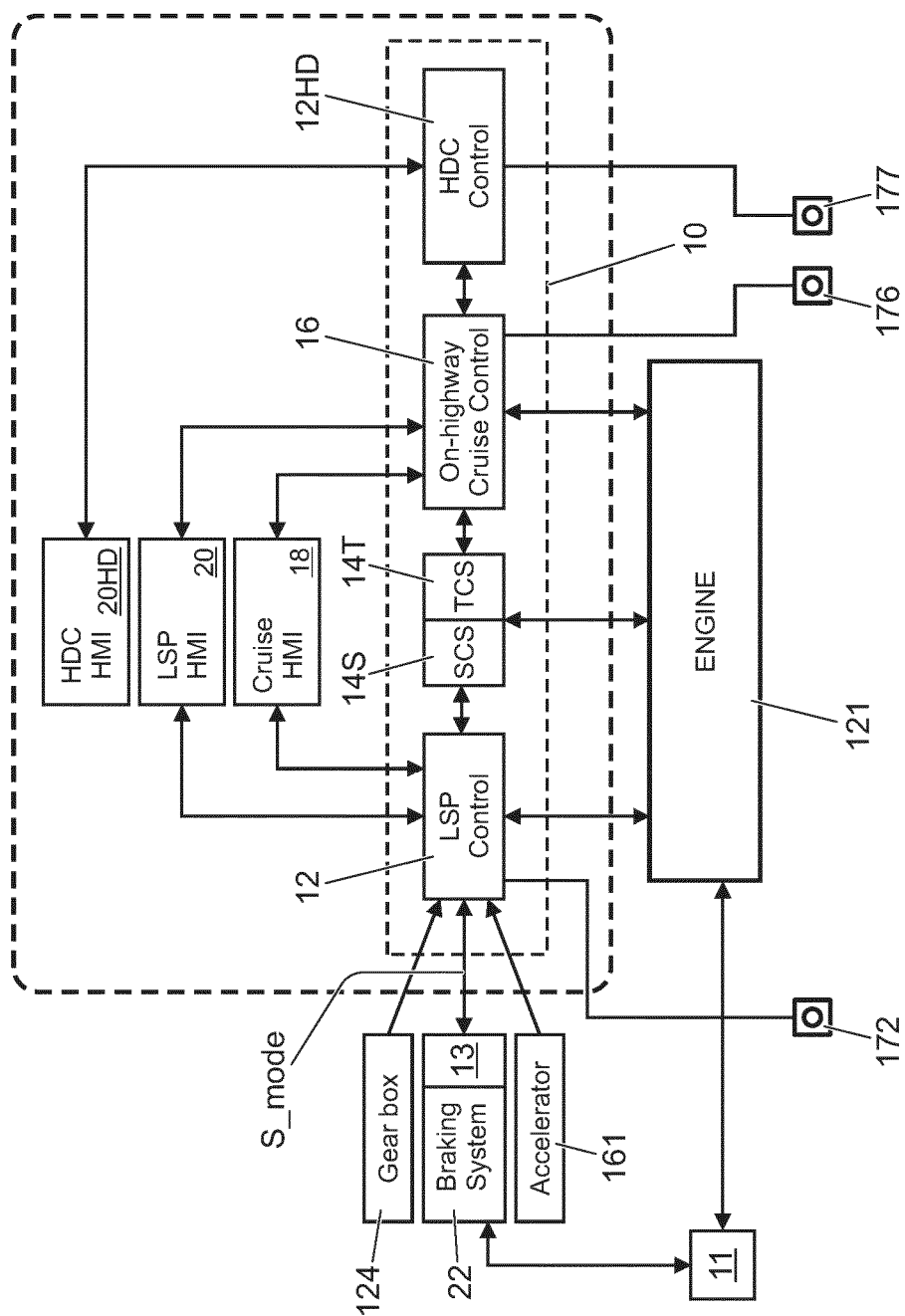
FIG. 3 is a high level schematic diagram of a speed control system of the vehicle of FIG. 1, including a cruise control system and a low-speed progress control system.

A control system for the vehicle 100 includes a central controller 10, referred to as a vehicle control unit (VCU) 10, the powertrain controller 11, a brake controller 13 and a steering controller 170C. The brake controller 13 is an anti-lock braking system (ABS) brake controller 13 and forms part of a braking system 22 (FIG. 3). The VCU 10 receives and outputs a plurality of signals to and from various sensors and subsystems (not shown) provided on the vehicle 100. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD.

The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel, i.e. to correct oversteer or understeer as is known in the art. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by one or more further controllers.

Similarly, one or more of the controllers 10, 11, 13, 170C may be implemented in software run on a respective one or more computing devices such as one or more electronic control units (ECUs). In some embodiments two or more of the controllers 10, 11, 13, 170C may be implemented in software run on one or more common computing devices. Two or more controllers 10, 11, 13, 170C may be implemented in software in the form of a combined software module.

It is to be understood that one or more computing devices may be configured to permit a plurality of software modules to be run on the same computing device without interference between the modules. For example the computing devices may be configured to allow the modules to run such that if execution of software code embodying a first controller terminates erroneously, or the computing device enters an unintended endless loop in respect of one of the modules, it does not affect execution of software code comprised by a software module embodying a second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, brake controller 13 and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 4:
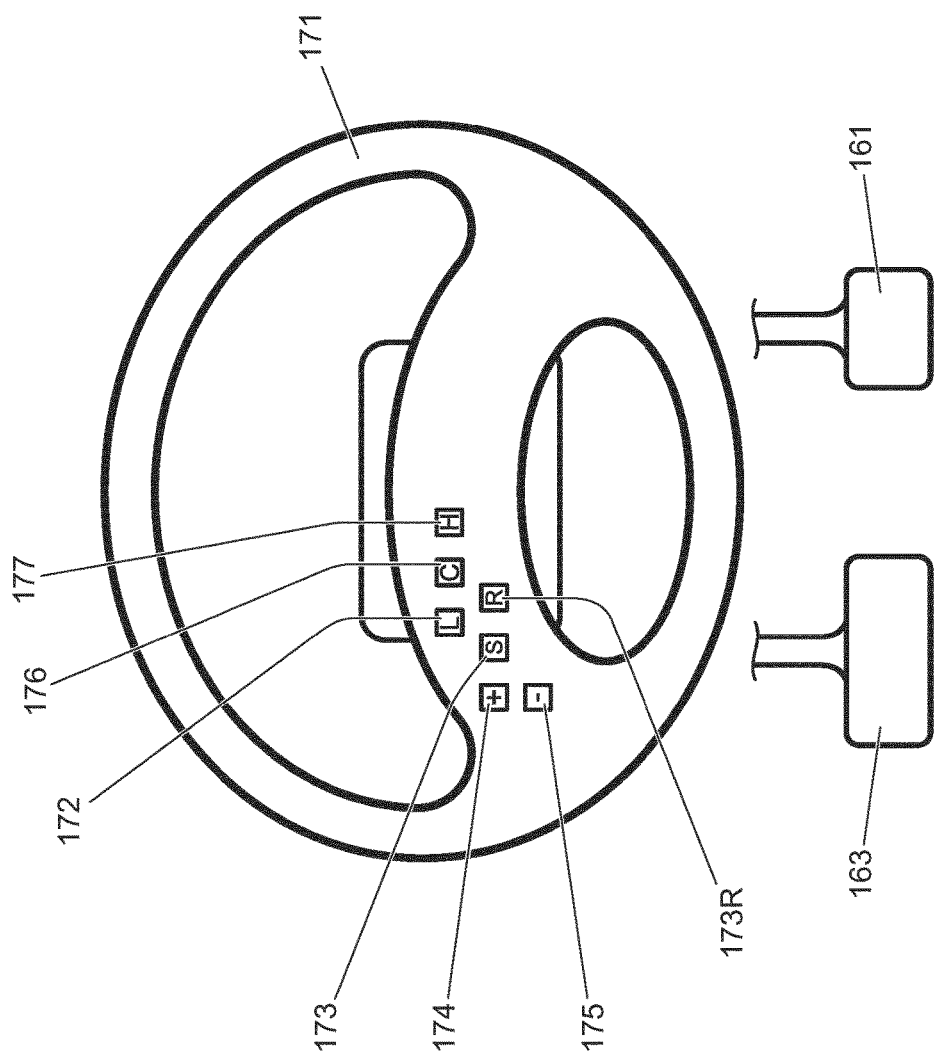
FIG. 4 illustrates a steering wheel and brake and accelerator pedals of the vehicle of FIG. 1.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 as shown in FIG. 3 by means of which the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following a driver over-ride intervention. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user, which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed. It is to be understood that in some embodiments the LSP control system selector button 172 may be mounted in a location other than on the steering wheel 171, such as in a dashboard or any other suitable location.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of user_set-speed by setting a parameter LSP_set-speed equal to the value of user_set-speed. In some embodiments, the system 12 may be configured to determine whether a lower value of LSP_set-speed is more appropriate as discussed in more detail below. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behavior when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel, user_set-speed, by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12. The visual display may be mounted on the steering wheel or other convenient location, for example on the dashboard, central console or similar. Alternatively the information may be provided by a heads-up display, for example it may be projected onto the windscreen.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161 and clutch pedal 165 indicative of a position of the clutch pedal 165. An input is also provided to the LSP control system 12 from the transmission 124. This includes signals representative of the speed of an output shaft of the gearbox 124, and the identity of the transmission mode in which the transmission 124 is operating at a given moment in time. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed parameter may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode (see below). The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate although as noted elsewhere the HDC system 12HD is not able to cause positive drive torque to be applied by the powertrain 129 in order to reduce a rate of deceleration of the vehicle 100. The maximum allowable rate of deceleration is set at 1.25 ms-2 in the present embodiment, however other values may be useful in some embodiments. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR) (RTM) System in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 five driving modes are provided: an 'on-highway' driving mode or 'special programs off' (SPO) mode suitable for driving on a relatively hard, smooth driving surface where a relatively high surface coefficient of friction exists between the driving surface and wheels of the vehicle; a 'sand' driving mode (SAND) suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead in some embodiments.

In the present embodiment, at any given moment in time the LSP control system 12 is in one of a plurality of allowable 'on' modes (also referred to as conditions or states) selected from amongst an active or full function (FF) mode, a descent control (DC) mode, also referred to as an intermediate mode, and a standby mode. The LSP control system may also assume an 'off' mode or condition. The active mode, DC mode and standby mode may be considered to be different 'on' modes or conditions of the LSP control system 12, i.e. different modes in which the LSP control system 12 is in an 'on' mode or condition as opposed to an 'off' mode or condition. In the off condition the LSP control system 12 only responds to pressing of the LSP selector button 172, which causes the LSP control system 12 to assume the on condition and the DC mode. When the LSP control system 12 assumes the on mode from the off mode in response to pressing of the LSP selector button, the value of user_set-speed is set to the instant speed of the vehicle 100 provided it is in the allowable range of speeds for operation of the LSP control system 12. If the vehicle speed 100 is above the allowable range of speeds for operation of the LSP control system 12, the value of user_set-speed is set to the highest allowable speed for operation of the LSP control system 12, i.e. 30 kph. The system 12 then sets the value of LSP_set-speed equal to user_set-speed.

In the active or full function mode, the LSP control system 12 actively manages vehicle speed in accordance with the value of LSP_set-speed, by causing the application of positive powertrain drive torque to one or more driving wheels or negative braking system torque to one or more braked wheels.

In the DC mode the LSP control system 12 operates in a similar manner to that in which it operates when in the active mode except that the LSP control system 12 is prevented from commanding the application of positive drive torque by means of the powertrain 129. Rather, only braking torque may be applied, by means of the braking system 22 and/or powertrain 129. The LSP control system 12 is configured to increase or decrease the amount of brake torque applied to one or more wheels in order to cause the vehicle to maintain a speed substantially equal to LSP_set-speed to the extent possible without application of positive drive torque. It is to be understood that, in the present embodiment, operation of the LSP control system 12 in the DC mode is very similar to operation of the HDC system 12HD, except that the LSP control system 12 continues to employ the LSP control system 12 set-speed value LSP_set-speed rather than the HDC control system set-speed value HDC_set-speed.

In the standby mode, the LSP control system 12 is unable to cause application of positive drive torque or negative brake torque to a wheel.

As noted above, in the 'off' mode the LSP control system 12 is not responsive to any LSP input controls except the LSP control system selector button 172. Pressing of the LSP control system selector button 172 when the system 12 is in the off mode causes the system 12 to assume the 'on' condition and the DC mode.

When the LSP control system 12 is initially switched on by means of the LSP selector button 172, the LSP control system 12 assumes the DC mode.

If whilst in DC mode the 'set +' button 174 is pressed, the LSP control system 12 sets the value of user_set-speed to the instant value of vehicle speed according to vehicle speed signal 36 (FIG. 7, discussed in more detail below) and assumes the active mode. If the vehicle speed is above 30 kph, being the maximum allowable value of user_set-speed and LSP_set-speed, the LSP control system 12 remains in the DC mode and ignores the request to assume the active mode. A signal may be provided to the driver indicating that the LSP control system 12 cannot be activated due to the vehicle speed exceeding the maximum allowable value of LSP_set-speed. The signal may be provided by means of a text message provided on the LSP control HMI 18, by means of an indicator lamp, an audible alert or any other suitable means.

If the resume button 173R is depressed whilst in the DC mode, the LSP control system assumes the active mode and causes the vehicle to operate in accordance with the stored value of user_set-speed, i.e. LSP_set-speed is set to the stored value of user_set-speed, provided the vehicle speed does not exceed 30 kph.

If vehicle speed is above 30 kph but less than or substantially equal to 50 kph when the resume button 173R is pressed the LSP control system 12 remains in the DC mode until vehicle speed falls below 30 kph. In the DC mode, provided the driver does not depress the accelerator pedal 161 the LSP control system 12 deploys the braking system 22 to slow the vehicle 100 to a speed substantially equal to the value of parameter LSP_set-speed. Once the vehicle speed falls to 30 kph or below, the LSP control system 12 assumes the active mode. In the active mode the system 12 is configured to cause a required amount of positive powertrain drive torque to be applied to one or more wheels via the powertrain 129, as well as negative torque via the powertrain 129 (via engine braking) and brake torque via the braking system 22 in order to control the vehicle in accordance with the LSP_set-speed value. The LSP control system 12 may generate a virtual accelerator pedal signal in order to cause the powertrain 129 to develop a required amount of powertrain torque in some embodiments. The virtual accelerator pedal signal may correspond to that which would be generated by an accelerator pedal controller in response to depression of the accelerator pedal 161 by an amount corresponding to the amount of powertrain torque required at a given moment in time. The accelerator pedal controller may form part of a powertrain controller 11 although other arrangements may be useful in some embodiments.

With the LSP control system 12 in the active mode, the user may increase or decrease the value of user_set-speed by means of the '+' and '−' buttons 174, 175. In addition, the user may optionally also increase or decrease the value of user_set-speed by lightly pressing the accelerator or brake pedals 161, 163 respectively. In some embodiments, with the LSP control system 12 in the active mode the '+' and '−' buttons 174, 175 may be disabled such that adjustment of the value of user_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful. In some embodiments, relatively light pressing on the accelerator pedal 161 may cause the value user_set-speed to increase whilst relatively light pressing on the brake pedal 163 may cause the value user_set-speed to decrease.

It is to be understood that in the present embodiment the LSP control system 12 is operable to cause the vehicle to travel in accordance with a value of LSP_set-speed in the range from 2-30 kph whilst the cruise control system 16 is operable to cause the vehicle to travel in accordance with a value of set-speed in the range from 25-150 kph. Other values may be useful in some embodiments. For example, in some embodiments the cruise control system 16 may be configured to allow a value of cruise_set-speed in the range 30-120 kph. Other suitable ranges of values for LSP_set-speed and cruise_set-speed may be useful in some embodiments.

It is to be understood that if the LSP control system 12 is in the active mode, operation of the cruise control system 16 is inhibited. The two speed control systems 12, 16 therefore operate independently of one another, so that only one can be operable at any one time.

In some embodiments, the cruise control HMI 18 and the LSP control HMI 20 may be configured within the same hardware so that, for example, the speed selection is input via the same hardware, with one or more separate switches being provided to switch between the LSP control HMI 20 and the cruise control HMI 18.

When in the active mode, the LSP control system 12 is configured to command application of positive powertrain torque and negative brake torque, as required, by transmitting a request for (positive) drive torque in the form of a powertrain torque signal and/or a request for (negative) brake torque in the form of a brake torque signal to the brake controller 13. The brake controller 13 arbitrates any demand for positive powertrain torque, determining whether the request for positive powertrain torque is allowable. If a request for positive powertrain torque is allowable the brake controller 13 issues the request to the powertrain controller 11. In some embodiments, the request for brake torque may correspond to an amount of brake torque (or brake fluid pressure) to be developed by the braking system 22. In some alternative embodiments the request for brake torque may be for an amount of negative torque to be applied to one or more wheels. The brake controller 13 may in some embodiments determine whether the requested negative torque is to be supplied by means of powertrain braking alone, for example engine overrun braking, by means of powertrain braking and brake torque developed by the braking system 22, or by means of the braking system 22 alone. In some embodiments the brake controller 13 or LSP control system 12 may be configured to cause a required amount of net negative torque to be applied to one or more wheels by applying negative torque by means of the braking system 22 against positive drive torque generated by the powertrain 129. Application of positive drive torque generated by means of the powertrain 129 against negative brake torque generated by means of the braking system 22 may be made in order to reduce wheel flare when driving on surfaces of relatively low surface coefficient of friction such as during off-road driving. By wheel flare is meant excessive wheel slip as a result of the application of excess positive net torque to a wheel.

The sensors on the vehicle 100 include sensors which provide continuous sensor outputs to the VCU 10, including wheel speed sensors, as mentioned previously and as shown in FIG. 1, and other sensors (not shown) such as an ambient temperature sensor, an atmospheric pressure sensor, tire pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used. Other sensors may be useful in addition or instead in some embodiments.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes for the vehicle subsystems is appropriate, with each control mode corresponding to a driving mode. Thus each control mode corresponds to a particular terrain type over which the vehicle may be travelling (for example, mud and ruts, sand, grass/gravel/snow).

If the user has selected operation of the vehicle in an automatic driving mode selection condition, the VCU 10 then selects the most appropriate one of the driving modes and is configured automatically to control the subsystems according to the selected mode. This aspect of the invention is described in further detail in our co-pending patent application nos. GB2492748, GB2492655 and GB2499252, the contents of each of which is incorporated herein by reference.

In some embodiments, the nature of the terrain over which the vehicle is travelling (as determined by reference to the selected driving mode) may be utilized by the LSP control system 12 to determine an appropriate increase or decrease in vehicle speed. For example, if the user selects a value of user_set-speed that is not suitable for the nature of the terrain over which the vehicle is travelling, the system 12 may in some embodiments automatically adjust the vehicle speed downwards by reducing the value of LSP_set-speed. In some cases, for example, the user selected speed may not be achievable or appropriate over certain terrain types, particularly in the case of uneven or rough surfaces. If the system 12 selects automatically a value of LSP_set-speed that differs from the value of user_set-speed, a visual indication of the speed constraint may be provided to the user via the LSP HMI 20 to indicate that an alternative speed has been adopted.

Figure 5:
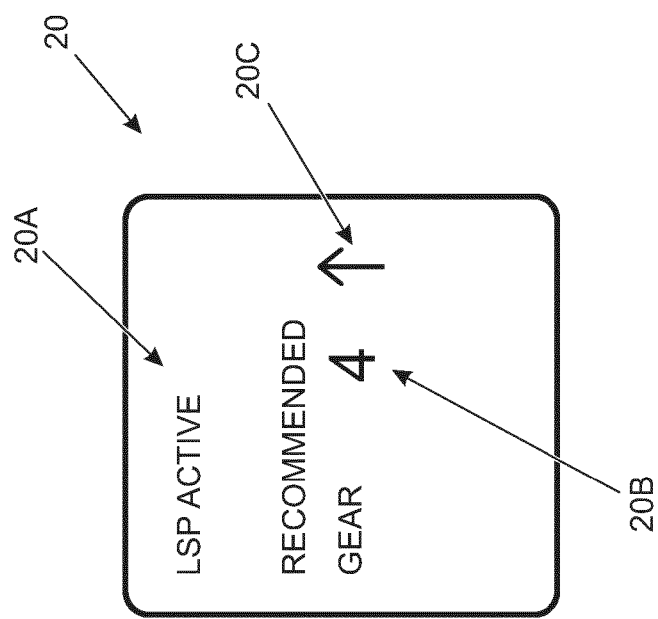
FIG. 5 illustrates a portion of a low-speed progress control system HMI display.

As noted above, the transmission 124 of the vehicle 100 is a manual transmission 124. In order to facilitate driving of the vehicle 100 by a user and assist the user to drive the vehicle 100 in a manner so as to maintain vehicle composure, the LSP control system 12 is configured to determine an optimum transmission gear ratio for the vehicle 100 at a given moment in time. The optimum transmission gear ratio is determined so as to permit the vehicle 100 to maintain progress over terrain in accordance with the prevailing value of LSP_set-speed. The transmission gear ratio is selected so as to avoid operating the engine 121 at unnecessarily high speeds, for example by operating in a selected transmission gear ratio that is too high (and the gear number therefore too low) whilst reducing the risk of stalling of the engine 121 due to selection of too low a transmission gear ratio (and therefore too high a gear number). In the present embodiment the LSP control system 12 provides an indication to the driver of the optimum gear number as determined by the LSP control system 12 by displaying the optimum gear number on the LSP HMI 20 in the form of a 'recommended' transmission gear number as shown at 20B in FIG. 5. If the currently selected transmission gear number is not the same as the recommended gear number the LSP control system 12 also displays an arrow 20C, pointing either in an upward direction or a downward direction, indicating whether the gear number should be increased or decreased in order to become equal to the recommended value. The arrow may be referred to as a 'shift light', 'shift lamp' or 'shift icon'. The LSP control system 12 also displays status information on the LSP HMI 20 at 20A, indicating whether the LSP control system 20 is in the active, DC or standby modes. It is to be understood that, in some embodiments, in addition to or instead of displaying the shift light, the LSP control system 12 may provide an audible warning to a driver indicating that a change in gear number is required.

The LSP control system 12 is further configured to assist the driver in engine speed control when changing transmission gear ratio in response to the display of a shift light. If the system 12 detects depression of clutch pedal 165 when a gear other than the currently selected gear is being recommended to the user by the system 12 via the LSP HMI 20, indicating that a user may be changing gear in response to the shift light, the system 12 attempts to maintain vehicle speed control, by means of the braking system 22 only, whilst the clutch pedal 165 is depressed. Thus, the LSP control system 12 continues to monitor vehicle speed and acceleration and attempts to cause the vehicle to operate in accordance with the prevailing value of LSP_set-speed using the braking system 22 alone. In some embodiments, the LSP control system 12 accomplishes this by temporarily assuming the DC mode when the clutch pedal 165 is depressed. It will be appreciated that the ability to maintain the set-speed by braking alone will depend upon the circumstances in which the vehicle is operating when a gear change is initiated. In the present embodiment, the system 12 detects the position of the clutch pedal 165 by means of a sensor 165S that generates and outputs to the LSP control system 12 a clutch actuation signal indicative of the actuation state of the clutch 123. In the present embodiment the clutch actuation signal provides an indication of the amount by which the clutch pedal 165 is displaced relative to an undepressed position, at a given moment in time.

When the clutch 165 is depressed, the LSP control system 12 instructs the powertrain controller 11 to cause the speed of the engine 121 to return to an idle speed. The idle speed may be any suitable idle speed, such as an idle speed employed when the LSP control system 12 is not in an on mode. The system 12 continues to monitor the identity of the selected gear of the transmission 124 and the position of the clutch pedal 165. If the system 12 detects that the user has selected the recommended transmission gear ratio, and has begun to release the clutch pedal 165, the system 12 commands the powertrain controller 11 to match the engine speed and transmission speed. The LSP control system 12 achieves this by controlling the engine speed in dependence on a predetermined parameter, in the present embodiment the speed of an output portion of the clutch 123 that is permanently connected to the transmission 124. The system 12 attempts to cause the engine speed to achieve a value that will cause a speed of an input portion of the clutch 123 to be substantially equal to the speed of the output portion of the clutch 123. In other words, the system 12 commands the powertrain controller 11 to cause the engine speed to achieve a value that will minimize slip, and ideally result in substantially no slip, between input and output portions of the clutch 123 as the clutch closes. This feature assists a user by reducing their workload since the user is able to focus their attention on terrain outside of the vehicle 100 rather than being concerned with matching engine speed and transmission speed. It is to be understood that in the present embodiment the input portion of the clutch 123 rotates at substantially the same speed as the engine 121 since they are directly connected in the present embodiment.

It is to be understood that the engine speed required in order to achieve substantially no slip across the clutch 123 will depend on the instant speed of the vehicle 100 and the selected transmission gear ratio. The value of engine speed at which substantially no speed mismatch is present between input and output portions of the clutch 123 will be referred to herein as a clutch-engaged engine speed.

In the present embodiment, the LSP control system 12 determines the clutch-engaged engine speed by multiplying the instant speed of the vehicle (given by a reference speed value v_ref) by a powertrain ratio factor PTR that takes into account the selected transmission gear ratio. That is, the powertrain ratio factor PTR depends on the selected gear ratio of the transmission 124. It is to be understood that the vehicle reference speed v_ref is an estimate of vehicle speed determined by the brake controller 13 in dependence on wheel speed.

In some alternative embodiments, instead of waiting until a user begins to release the clutch pedal 165 before attempting to match engine speed and transmission speed, the LSP control system 12 may be configured to begin to attempt to cause the speed of the engine 121 to become equal to the clutch-engaged engine speed once a user has selected the recommended transmission gear ratio after depressing the clutch pedal 165 and before the user begins to release the clutch pedal 165. That is, the system 12 may attempt to cause the speed of the engine 121 to become equal to the clutch-engaged engine speed without waiting for the user to begin to release the clutch pedal 165. Other arrangements may be useful in some embodiments.

It is to be understood that, in the present embodiment, if the user does not select the recommended gear ratio in response to the prompt displayed by the LSP control system 12, the LSP control system 12 does not attempt to cause the engine speed to become equal to the clutch-engaged engine speed according to the newly selected transmission gear ratio. Rather, the system 12 causes the engine speed to remain at the idle speed unless the user depresses the accelerator pedal 161 to increase the engine speed in the normal manner. In such embodiments therefore, if a user selects a gear other than the recommended gear and wishes to match engine speed and transmission speed before closing the clutch, the user may attempt to cause engine speed to become substantially equal to the clutch-engaged speed by actuation of the accelerator pedal 161. In some alternative embodiments, the LSP control system 12 may be configured to attempt to cause the engine speed to become equal to the clutch-engaged engine speed for the currently selected transmission gear ratio regardless of whether the user has selected the gear ratio recommended by the LSP control system 12. This feature may therefore allow a user to override the recommendation provided by the LSP control system 12 and still enjoy the benefit of automatic engine speed matching. Thus it is to be understood that the LSP control system 12 attempts to control engine speed according to a predetermined transmission ratio which in some embodiments is the recommended transmission ratio only, and in some alternative embodiments is whatever transmission ratio the user selects once the clutch pedal 165 is depressed, regardless of whether the selected transmission ratio is the recommended transmission ratio. In some embodiments the LSP control system 12 may attempt to control engine speed according to the recommended transmission ratio when a user initially depresses the clutch pedal 165. The LSP control system 12 may then update the predetermined transmission ratio to be equal to the prevailing transmission ratio and thereby control engine speed according to the prevailing transmission ratio once the user begins to release the clutch pedal 165. In some embodiments the LSP control system 12 may control engine speed according to a predetermined transmission ratio that is the transmission ratio selected by the user as soon as a user makes a change in the selected transmission ratio. If the user selects more than one transmission ratio in sequence before releasing the clutch 165, the LSP control system 12 may change the value of the predetermined transmission ratio to maintain the predetermined transmission ratio substantially equal to the transmission ratio selected at any given moment in time.

In the present embodiment, the LSP control system 12 is configured to attempt to maintain vehicle speed control using the braking system 22 whenever the clutch pedal 165 is depressed during operation in the active mode. Once the clutch pedal 165 is subsequently released, the LSP control system 12 resumes vehicle speed control with the application of positive or negative powertrain torque by means of the engine 121, and/or brake torque by means of the braking system 22, as required. The LSP control system 12 continues to operate in the active mode regardless of the gear selected by the user provided the gear is one of a predetermined selection of gears for which operation of the LSP control system 12 in the active mode is permitted, as described in more detail below.

The LSP control system 12 is configured to operate in the active mode only when the transmission 124 is in one of a predetermined selection of gear numbers or the neutral mode. In the present embodiment the LSP control system 12 is configured to operate in the active modes when any of gears 2 to 5 are selected. In the present embodiment gears 2 and 5 represent powertrain gear ratios, i.e. gear ratios between engine 121 and a driven wheel 112, of 8.6 and 3.5 respectively. It is to be understood that the ratios will be dependent upon the gear ratios of the vehicle in question and may vary without departing from the invention.

In some embodiments in which operation of the LSP control system 12 is limited to a predetermined selection of gear numbers or gear ratios, the system 12 may be configured to recommend only one of the predetermined selection of gear numbers or ratios via the LSP HMI 20. Furthermore, if a user selects a gear number or ratio other than one of the predetermined selection available for operation in the active mode, the system 12 may automatically assume the DC mode.

As noted above, the LSP control system 12 is operable to cause the vehicle to travel in accordance with a value of LSP_set-speed in the range from 2-30 kph. In the present embodiment, if the LSP control system 12 is in the DC mode the system 12 may be caused to assume the active mode from the DC mode by pressing the LSP control system selector button 172 provided the conditions are met that the vehicle 100 is (a) travelling at a speed in the range from 2-30 kph; (b) the transmission 124 is operating in one of the predetermined selection of gear numbers for operation of the LSP control system 12 (gears 2 to 5 in the present embodiment); and (c) the clutch 123 is in the closed condition.

As noted above, in some embodiments the LSP control system 12 may be configured automatically to assume the DC mode from the active mode when the user depresses the clutch pedal 165. In such instances, the LSP control system 12 may be configured automatically to resume operation in the active mode upon release of the clutch 165 provided the transmission gear number is one of the allowable gear numbers for operation in the active mode. In some embodiments such as the present embodiment, the LSP control system 12 may be considered to assume an 'active-suspend' mode if the clutch 165 is depressed whilst the LSP control system 12 is operating in the active mode. In the active-suspend mode, the LSP control system 12 remains in the active mode but suspends causing the engine 121 to deliver drive torque to cause the vehicle to operate in accordance with the value of LSP_set-speed. It is to be understood that the active-suspend mode may be considered to be substantially the same in terms of vehicle operation as the DC mode. The system 12 resumes the active mode from the active-suspend mode upon release of the clutch 165 when one of the predetermined selection of allowable transmission gear numbers for operation in the active mode is selected.

In some embodiments, if a driver requests a change in the value of user_set-speed and the LSP control system 12 determines that a change in the value of LSP_set-speed is permissible, the LSP control system 12 may determine whether a change in recommended transmission gear is required in order to cause the corresponding change in vehicle speed. If a change in recommended transmission gear is required, the LSP control system 12 may be configured not to permit a change in the value of LSP_set-speed until the user has selected the recommended transmission gear and released the clutch 165 to engage the engine 121 and transmission 124.

In some embodiments, the LSP control system 12 may be configured initially to assume the active mode from the DC mode once a driver has established the vehicle at the desired value of user_set-speed with the transmission 124 operating with the recommended gear number selected.

In some embodiments, the LSP control system 12 may be configured to provide an indication on the LSP HMI 20 of the speed the driver must achieve, and the gear number that must be selected, in order for the LSP control system 12 to assume the active mode. In some embodiments the LSP control system 12 may automatically assume the active mode once a user has indicated that the active mode is desired and these conditions are met.

Alternatively, in some embodiments the LSP control system 12 may require the user to select the active mode by depressing the LSP control system selector button 172 when the vehicle is travelling with the transmission 124 operating with the recommended gear number selected and vehicle speed set to a value within the allowable range for operation of the LSP control system 12 in the active mode. In some embodiments the LSP control system 12 may further require that the vehicle speed is within a predetermined range of the value of LSP_set-speed, for example within 5 kph of the value of LSP_set-speed, or at a speed that is within 20% of the value of LSP_set-speed. Other arrangements may be useful in some embodiments.

Figure 6:
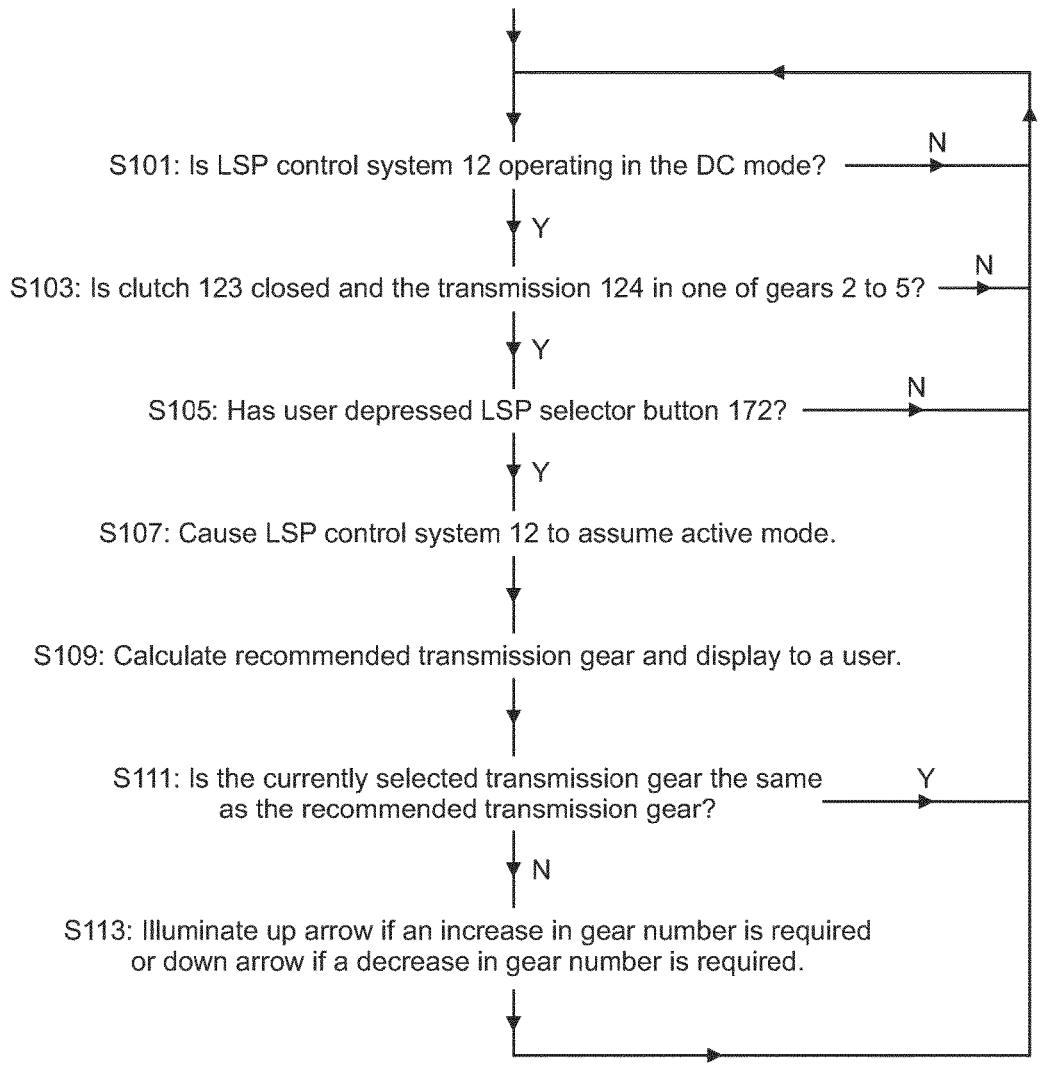
FIG. 6 is a flow diagram of illustrating an aspect of a method of controlling vehicle speed according to an embodiment of the present invention.
Figure 7:
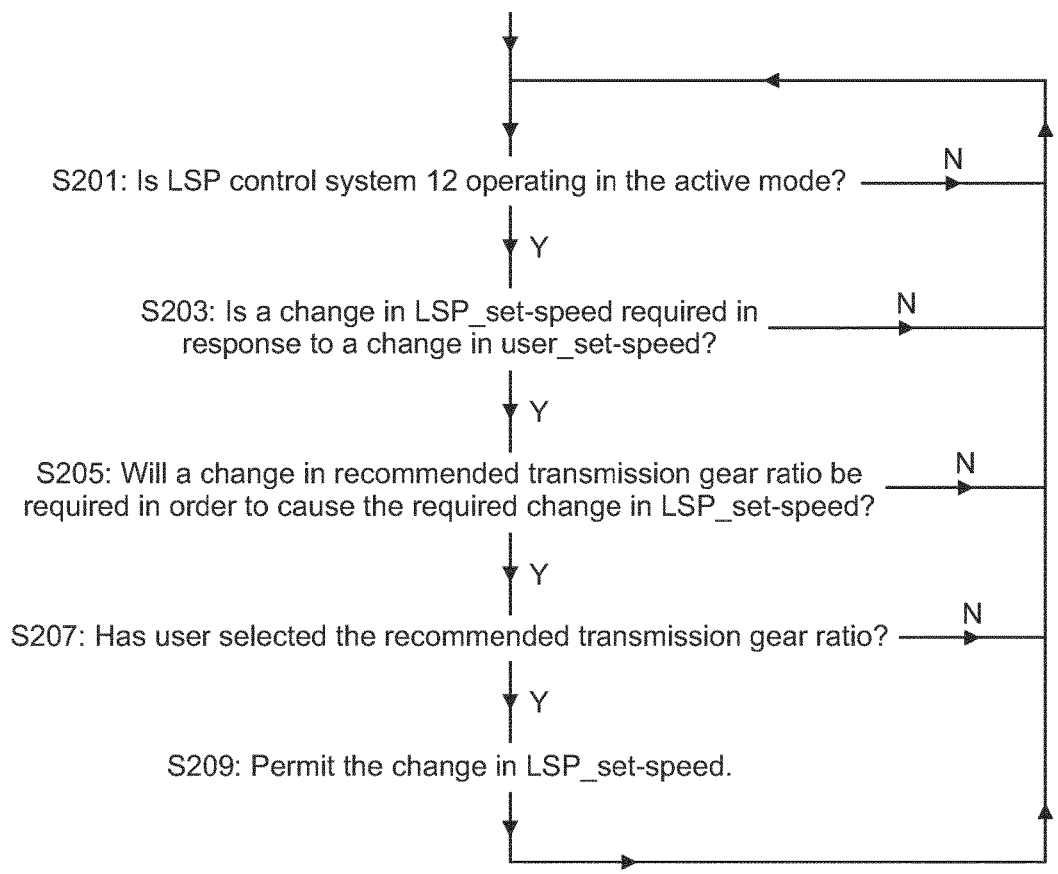
FIG. 7 is a flow diagram of illustrating a further aspect of a method of controlling vehicle speed according to an embodiment of the present invention.
Figure 8:
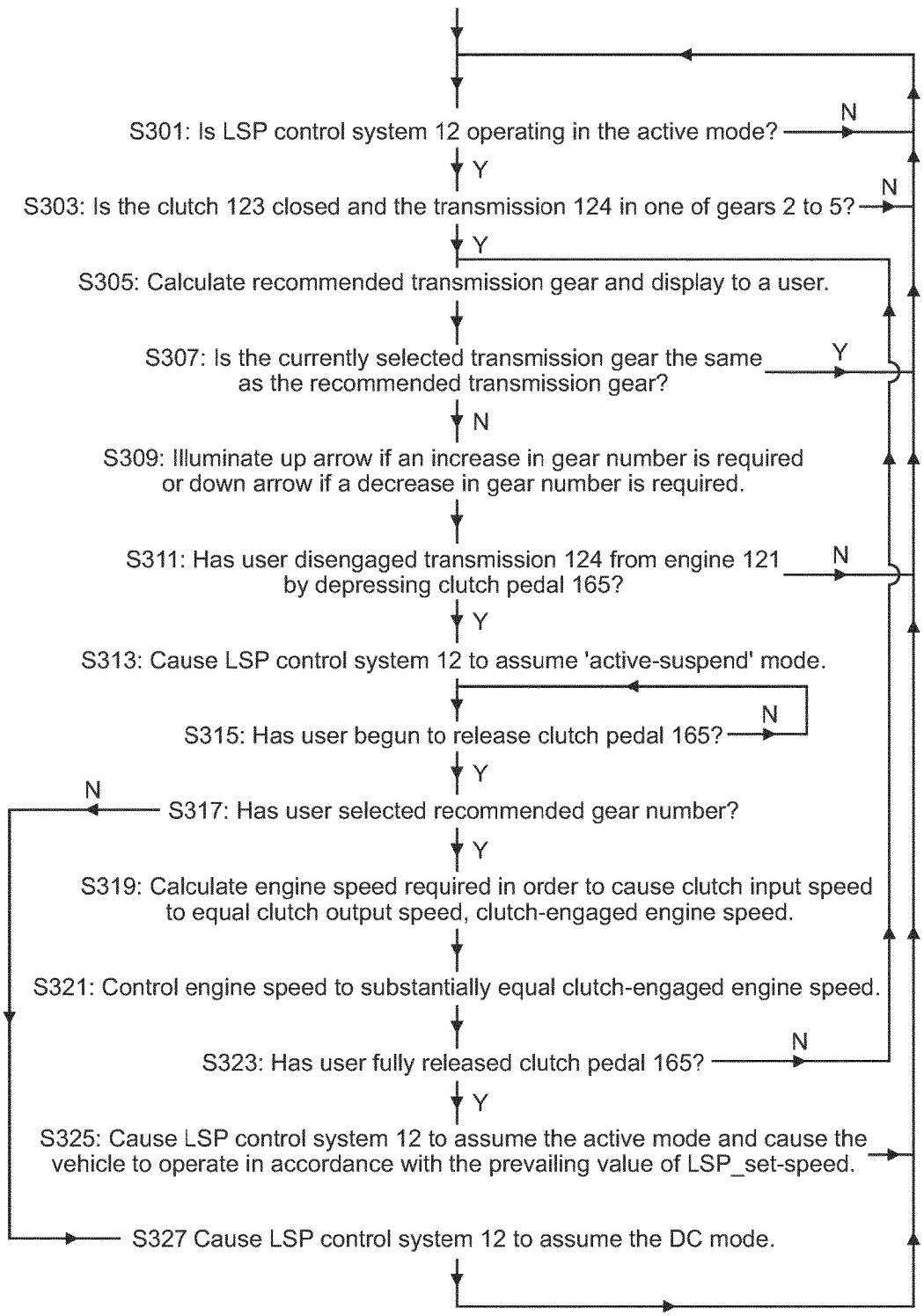
FIG. 8 is a flow diagram of illustrating a still further aspect of a method of controlling vehicle speed according to an embodiment of the present invention.

Operation of the LSP control system 12 of the present embodiment of the invention may be understood by reference to FIGS. 6 to 8.

FIG. 6 is a flow diagram illustrating an aspect of the manner in which the LSP control system 12 controls information displayed on the LSP HMI 20.

At step S101, the VCU 10 checks if the LSP control system 12 is operating in the DC mode. If the LSP control system 12 is operating in the DC mode the method continues at step S103 else step S101 is repeated.

At step S103 the VCU 10 checks whether the clutch 123 is closed and the transmission 124 is in one of gears 2 to 5. If these conditions are met the method continues at step S105 else the method continues at step S101.

At step S105 the VCU 10 checks whether the user has depressed the LSP selector button 172. If the user has depressed the LSP selector button 172 the method continues at step S107 else the method continues at step S101.

At step S107 the VCU 10 causes the LSP control system 12 to assume the active mode. The method then continues at step S109.

At step S109 the LSP control system 12 calculates a recommended value of transmission gear ratio and displays the recommended value on the LSP HMI 20. The method then continues at step S111.

At step S111 the LSP control system 12 determines whether the currently selected transmission gear is the same as the recommended transmission gear. If the currently selected transmission gear is the same as the recommended transmission gear the method continues at step S101 else the method continues at step S113.

At step S113 the LSP control system 12 illuminates an arrow on the LSP HMI 20. An 'up arrow' is illuminated if the recommended gear has a higher gear number than the currently selected gear number. A 'down arrow' is illuminated if the recommended gear has a lower gear number than the currently selected gear number. The method then continues at step S101.

The method described with respect of FIG. 6 describes the process by which the LSP control system 12 may assume the active mode, and the LSP HMI 20 caused to prompt a user to select a recommended transmission gear number as the vehicle 100 operates with the LSP control system 12 in the active mode.

FIG. 7 describes a method by which the LSP control system 12 decides whether to permit the value of LSP_set-speed to be increased or decreased in response to user input, when a change in transmission gear ratio is required in order to enable the change in LSP_set-speed.

At step S201 the VCU 10 determines whether the LSP control system 12 is operating in the active mode. If the LSP control system 12 is operating in the active mode the method continues at step S203 else step S201 is repeated.

At step S203 the LSP control system 12 determines whether a change in LSP_set-speed is required in response to a change in the value of user_set-speed. It is to be understood that, provided the LSP control system 12 has not determined that a lower speed is more appropriate, the value of LSP_set-speed will be set substantially equal to the value of user_set-speed and any changes in the value of user_set-speed will result in a corresponding change in the value of LSP_set-speed. If the maximum allowable value of LSP_set-speed has been limited to a value less than the prevailing value of user_set-speed, any changes in the value of user_set-speed will not result in a change in the value of LSP_set-speed unless the value of user_set-speed falls below the prevailing maximum allowable value of LSP_set-speed. If a change in LSP_set-speed is required the method continues at step S205 else the method continues at step S201.

At step S205 the LSP control system 12 determines whether a change in recommended transmission gear ratio is required in order to allow the required change in vehicle speed in order to maintain vehicle speed equal to LSP_set-speed. If a change in transmission gear ratio is required the method continues at step S207 else the method continues at step S201.

At step S207 the LSP control system 12 determines whether the user has selected the recommended transmission gear ratio. If the user has selected that ratio the method continues at step S209 else the method continues at step S201.

At step S209 the LSP control system 12 permits the change in LSP_set-speed. The method then continues at step S201.

It is to be understood that the method illustrated in FIG. 7 has the feature that changes in the value of LSP_set-speed for which the currently selected transmission gear ratio is inappropriate may be ignored by the LSP control system 12 until an appropriate transmission gear ratio has been selected.

It is to be understood that in some cases, for example where a relatively large change in the value of LSP_set-speed is required, the LSP control system 12 may require that a first change in transmission gear takes place in order to allow acceleration or deceleration towards the required value of LSP_set-speed, followed by a second and optionally a further change in transmission gear ratio before the vehicle becomes established at the new value of LSP_set-speed. In such cases, the LSP control system 12 may behave in a similar manner, at least initially, requiring that the user select the recommended gear ratio to allow vehicle speed to begin to change towards the value LSP_set-speed, before requiring a further change in order to allow vehicle speed to further approach LSP_set-speed. Other arrangements may be useful in some embodiments.

FIG. 8 illustrates a further aspect of the method of operation of the LSP control system 12 of the present embodiment.

At step S301 the VCU 10 determines whether the LSP control system 12 is operating in the active mode. If the LSP control system 12 is operating in the active mode the method continues at step S303 else step S301 is repeated.

At step S303 the LSP control system 12 checks whether the clutch 123 is closed and the transmission 124 is in one of the predetermined allowable gear numbers for operation of the LSP control system 12 in the active mode, i.e. one of gears 2 to 5. If the clutch 123 is closed and the transmission 124 is in one of gears 2 to 5 the method continues at step S305 else the method continues at step S301.

At step S305 the LSP control system 12 calculates the recommended transmission gear and displays the recommended gear to the user by means of the LSP HMI 20. The method then continues at step S307.

At step S307 the LSP control system 12 determines whether the currently selected transmission gear is the same as the recommended transmission gear. If the currently selected transmission gear is the recommended gear the method continues at step S301 else the method continues at step S309.

At step S309 the LSP control system 12 illuminates an up arrow on the LSP HMI if the recommended gear number is higher than the currently selected gear number. The LSP control system 12 illuminates a down arrow on the LSP HMI if the recommended gear number is lower than the currently selected gear number. The method then continues at step S311.

At step S311 the LSP control system 12 determines whether the user has disengaged the transmission 124 from the engine 121 by depressing the clutch pedal 165. If the user has disengaged the transmission 124 from the engine 121 by depressing the clutch pedal 165 the method continues at step S313 else the method continues at step S301.

At step S313 the LSP control system is caused to assume the 'active-suspend' mode in which control of the engine 121 to apply drive torque to the driveline 130 and cause the vehicle to operate in accordance with the value of LSP_set-speed is suspended. The method then continues at step S315.

At step S315 the LSP control system 12 determines whether the user has begun to release the clutch pedal 165. If the user has begun to release the clutch pedal 165 the method continues at step S317 else the method repeats step S315.

At step S317 the LSP control system 12 determines whether the user has selected the recommended gear number, i.e. whether the transmission gear ratio is now the recommended gear ratio. If the transmission gear ratio is now the recommended gear ratio the method continues at step S319 else the method continues at step S327.

At step S319 the LSP control system 12 calculates the engine speed required in order to cause an input speed of the clutch 123 to be substantially equal to an output speed of the clutch. 123. As described above this value of engine speed may be referred to as a clutch-engaged engine speed. The method then continues at step S321.

At step S321 the LSP control system 12 attempts to cause the powertrain controller 11 to cause the engine speed to become substantially equal to the clutch-engaged engine speed. The method then continues at step S323.

At step S323 the LSP control system 12 checks whether the user has fully released the clutch pedal 165. If the user has fully released the clutch pedal 165 the method continues at step S325 else the method continues at step S305.

At step S325 the LSP control system 12 is caused to assume the active mode. The vehicle 100 is then caused to operate in accordance with the prevailing value of LSP_set-speed. The method then continues at step S301.

At step S327 the LSP control system 12 assumes operation in the DC mode. The method then continues at step S301.

Some embodiments of the present invention have the feature that vehicle composure may be maintained and driver workload reduced by permitting an LSP control system to continue controlling vehicle speed when a user performs a manual gear change operation. The LSP control system does not cancel speed control upon depression of a clutch; rather, the system continues controlling vehicle speed, optionally by means of a braking system, thereby allowing vehicle composure to be maintained and driver workload to be reduced. In some embodiments, the LSP control system may in addition control the speed of a torque drive source such as an engine in order to enable matching of torque drive source speed to transmission speed when a manual gear change operation is performed.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A speed control system for automatically controlling a speed of a vehicle in accordance with a target speed value, the system comprising:
   means for causing automatically a vehicle to travel at a predetermined speed value at least in part by controlling an amount of torque applied to one or more wheels of a vehicle by a powertrain;
   means for determining a recommended transmission gear ratio for a transmission of the powertrain at a given moment in time;
   means for providing an indication of the recommended transmission gear ratio to a user; and
   means for receiving a clutch actuation signal indicative of an actuation state of clutch means that is configured to connect the transmission to a torque drive source of the powertrain,
   wherein the system is configured to automatically control a speed of the torque drive source to achieve a speed determined in dependence at least in part on at least one predetermined parameter when a predetermined one or more conditions are met, the predetermined one or more conditions including a condition that the clutch actuation signal indicates that the actuation state of the clutch means is such that the torque drive source is at least partially disconnected from the transmission;
   wherein the at least one predetermined parameter includes a signal indicative of a currently selected transmission gear ratio, the system being configured to control the speed of the torque drive source to achieve a speed at which a speed of an input portion of the clutch means will be substantially equal to that of an output portion of the clutch means with the currently selected transmission gear ratio, and
   wherein the system is configured to begin controlling the speed of the torque drive source to achieve the predetermined speed before the clutch means transitions to a state in which the torque drive source is substantially fully connected to the transmission.

2. The system according to claim 1 wherein the clutch actuation signal indicative of the actuation state of the clutch means comprises a signal indicative of a position of a user actuated clutch means control or an amount of pressure applied to the user actuated clutch means control by the user.

3. The system according to claim 2, wherein the predetermined one or more conditions include a condition that the clutch actuation signal indicates that the user actuated clutch means control is being or has been actuated so as to begin to cause the clutch means to transition from a state in which the torque drive source is at least partially disconnected from the transmission towards a state in which the torque drive source is substantially fully connected to the transmission.

4. The system according to claim 1 wherein the at least one predetermined parameter includes a signal indicative of the recommended transmission gear ratio, the system being configured to control the speed of the torque drive source to achieve a speed at which a speed of an input portion of the clutch means would be substantially equal to that of an output portion of the clutch means with the recommended transmission gear ratio selected.

5. The system according to claim 1 wherein the predetermined condition that the clutch actuation signal indicates that the actuation state of the clutch means is such that the torque drive source is at least partially disconnected from the transmission comprises a condition that the clutch actuation signal indicates that the actuation state of the clutch means is such that the torque drive source is substantially fully disconnected from the transmission.

6. The system according to claim 1 configured to temporarily suspend application of powertrain torque to cause the vehicle to travel at the predetermined speed value in dependence on the clutch actuation signal, the system being configured to attempt to cause the vehicle to travel at the predetermined speed value by causing application of brake torque by means of a braking system when the clutch actuation signal indicates the torque drive source and the transmission have been at least partially disconnected from one another.

7. The system according to claim 6 configured to recommence causing the vehicle to travel at the predetermined speed value at least in part by application of the powertrain torque when the clutch actuation signal indicates that the torque drive source has been substantially fully reconnected to the transmission by the clutch means.

8. The system according to claim 1 wherein the means for causing automatically the vehicle to travel at the predetermined speed value and the means for determining the recommended transmission gear ratio for the transmission comprise an electric controller, the electric controller being configured to output a signal to cause the powertrain to apply a required amount of powertrain torque to one or more wheels of the vehicle.

9. The system according to claim 8 wherein the electric controller is configured to determine the required amount of powertrain torque in dependence at least in part upon a difference between an instant speed of the vehicle and a required speed value.

10. The system according to claim 1 wherein the means for providing the indication of the recommended transmission gear ratio to the user comprises means for providing a visual and/or audible indication whether an increase or decrease in transmission gear ratio is required.

11. A vehicle comprising the system according to claim 1, further comprising: the powertrain comprising the torque drive source and the transmission; and the clutch means configured to selectively connect the transmission to the torque drive source.

12. A method of controlling automatically a speed of a vehicle in accordance with a target speed value, the method comprising:
   causing automatically the vehicle to travel at a predetermined speed value at least in part by controlling an amount of torque applied to one or more wheels of the vehicle by a powertrain;
   determining a recommended transmission gear ratio for a transmission of the powertrain at a given moment in time;
   providing an indication of the recommended transmission gear ratio to a user, and
   receiving a clutch actuation signal indicative of an actuation state of clutch means configured to connect the transmission to a torque drive source of the powertrain,
   the method comprising automatically controlling a speed of the torque drive source to achieve a speed determined in dependence at least in part on a predetermined parameter when a predetermined one or more conditions are met, the predetermined one or more conditions including a condition that the clutch actuation signal indicates that the actuation state of the clutch means is such that the torque drive source is at least partially disconnected from the transmission;

wherein the at least one predetermined parameter includes a signal indicative of a currently selected transmission gear ratio, the method comprising controlling the speed of the torque drive source to achieve a speed at which a speed of an input portion of the clutch means will be substantially equal to that of an output portion of the clutch means with the currently selected transmission gear ratio, wherein controlling the speed of the torque drive source to achieve the predetermined speed begins before the clutch means transitions to a state in which the torque drive source is substantially fully connected to the transmission.

13. The method according to claim 12 whereby the clutch actuation signal indicative of the actuation state of the clutch means comprises a signal indicative of a position of a user actuated clutch means control or an amount of pressure applied to a user actuated clutch means control by a user.

14. The method according to claim 12, whereby the predetermined one or more conditions include the condition that the clutch actuation signal indicates that the clutch means control is being or has been actuated so as to begin to cause the clutch means to transition from a state in which the torque drive source is at least partially disconnected from the transmission towards a state in which the torque drive source is substantially fully connected to the transmission.

15. A non-transitory computer readable medium configured with computer readable code to carry out the method of claim 12.

* * * * *